United States Patent
Mobin et al.

(10) Patent No.: US 10,216,688 B2
(45) Date of Patent: Feb. 26, 2019

(54) SYSTEMS AND METHODS FOR ACCURATE TRANSFER MARGIN COMMUNICATION

(71) Applicant: Avago Technologies International Sales Pte. Limited, Singapore (SG)

(72) Inventors: Mohammad Mobin, Orefield, PA (US); Shaohua Yang, San Jose, CA (US); John Jansen, Macungie, PA (US); Haitao Xia, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 392 days.

(21) Appl. No.: 15/166,495

(22) Filed: May 27, 2016

(65) Prior Publication Data
US 2017/0344509 A1  Nov. 30, 2017

(51) Int. Cl.
*G06F 13/42* (2006.01)

(52) U.S. Cl.
CPC .............. *G06F 13/4282* (2013.01)

(58) Field of Classification Search
CPC ............ G06F 13/4282; G06F 13/42
USPC ........................................ 710/313
See application file for complete search history.

(56) References Cited

U.S. PATENT DOCUMENTS

| | | | |
|---|---|---|---|
| 8,718,184 B1* | 5/2014 | Cronie | G06F 13/42 375/295 |
| 2003/0097231 A1* | 5/2003 | Cheng | H04L 1/205 702/108 |
| 2003/0112241 A1* | 6/2003 | Fernando | G06T 11/206 345/440 |
| 2003/0158687 A1* | 8/2003 | Nygaard, Jr. | G01R 13/029 702/117 |
| 2005/0160327 A1* | 7/2005 | Baig | G01R 31/31711 714/47.2 |
| 2006/0190200 A1* | 8/2006 | Nygaard, Jr. | G01R 13/0218 702/68 |
| 2006/0256847 A1* | 11/2006 | Nygaard, Jr. | G01R 1/025 375/224 |
| 2015/0010121 A1* | 1/2015 | Su | H04B 17/0062 375/355 |
| 2015/0089164 A1* | 3/2015 | Ware | G11C 5/02 711/149 |
| 2015/0256326 A1* | 9/2015 | Simpson | H04L 7/0025 375/355 |
| 2015/0378619 A1* | 12/2015 | Maeda | G06F 3/061 707/725 |
| 2018/0069692 A1* | 3/2018 | Morris | H04L 7/0041 |

* cited by examiner

*Primary Examiner* — Christopher B Shin
(74) *Attorney, Agent, or Firm* — Sheridan Ross P.C.

(57) ABSTRACT

Embodiments are related to systems and methods for data transfer, and more particularly to systems and methods for providing transfer margin information.

24 Claims, 5 Drawing Sheets

SYSTEMS AND METHODS FOR ACCURATE TRANSFER MARGIN COMMUNICATION

FIELD OF THE INVENTION

Embodiments are related to systems and methods for data transfer, and more particularly to systems and methods for providing transfer margin information.

BACKGROUND

A number of data transfer systems have been developed. Some transfer systems transfer information in serial. To increase data transfer rates the period between bit periods is decreased. While such reduction in period results in increased transfer rates, in results in a corresponding decrease in sampling window. Decreasing the sampling window increases the probability for data errors due to sampling inaccuracy. To assure an accurate representation of the sampling window, a receiving device may characterize the sampling window and share such information with a transferring partner device. However, sharing such window characterization information at times misrepresents actual transfer capability.

Hence, for at least the aforementioned reasons, there exists a need in the art for advanced systems and methods for assuring proper transfers.

SUMMARY

Embodiments are related to systems and methods for data transfer, and more particularly to systems and methods for providing transfer margin information.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
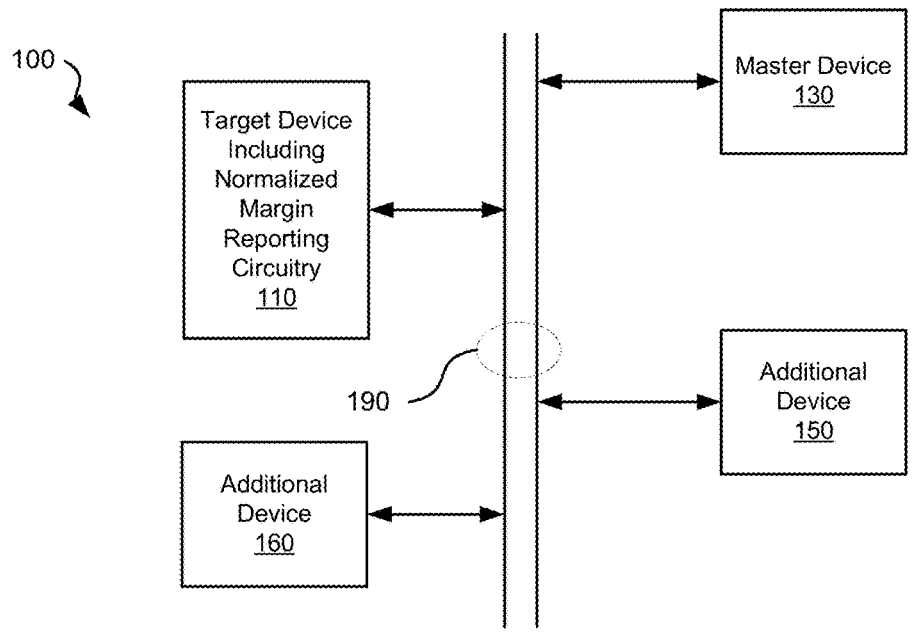
FIG. 1 shows a bus based system including a target device having normalized margin reporting circuitry in accordance with various embodiments of the present inventions.

Embodiments are related to systems and methods for data transfer, and more particularly to systems and methods for providing non-standard bus information.

Some embodiments of the present inventions provide data processing systems that include: a sampling latch, a first duration margin determination circuit, a second duration margin determination circuit, and a margin normalization circuit. The sampling latch is operable to sample a received serial data input and provide a corresponding serial data output. The first duration margin determination circuit is operable to: define a first contour of a data signal eye corresponding to the serial data output over a first number of bit periods, and determine a first margin characteristic based upon the first contour. The second duration margin determination circuit is operable to: define a second contour of the data signal eye corresponding to the serial data output over a second number of bit periods, and determine a second margin characteristic based upon the second contour. The margin normalization circuit is operable to calculate a normalized value based upon a combination of the first margin characteristic and the second margin characteristic.

In some instances of the aforementioned embodiments, the systems further include a target margin calculation circuit operable to determine a target margin value. In such instances, the margin normalization circuit is further operable to multiply the target margin value by the normalized value to yield a margin output. In some cases, a margin output circuit operable to format the margin output to yield a formatted margin output; and a bus circuit operable to transmit the formatted margin output to a recipient device over a bus. In various cases, the received serial data input is received from the recipient device via the bus. In particular cases, the bus is a PCIe™ bus.

In various instances of the aforementioned embodiments, the second number of bit periods is at least ten times greater than the first number of bit periods. In some cases, the second number of bit periods is greater than one hundred million bit periods and the first number of bit periods is less that one hundred thousand bit periods. In one or more instances of the aforementioned embodiments, the first margin characteristic is a first lateral margin, the second margin characteristic is a second lateral margin, and the target margin value is a target margin voltage. In some instances of the aforementioned embodiments, the first margin characteristic is a first margin voltage, the second margin characteristic is a second margin voltage, and the target margin value is a target lateral margin.

In some instances of the aforementioned embodiments, calculating the normalized value based upon the combination of the first margin characteristic and the second margin characteristic includes dividing the second margin characteristic by the first margin characteristic. In one or more instances of the aforementioned embodiments, defining the first contour of the data signal eye includes comparing the serial data output with expected values over the first number of bit periods; and defining the second contour of the data signal eye includes comparing the serial data output with expected values over the second number of bit periods. In particular instances of the embodiments, the system is implemented as part of a storage device.

Other embodiments of the present inventions provide methods for margin determination that include: repeatedly sampling a received serial data input by a sampling latch circuit to yield a corresponding serial data output; defining a first contour of a data signal eye corresponding to the serial data output over a first number of bit periods; determining a first margin characteristic based upon the first contour; defining a second contour of a data signal eye corresponding to the serial data output over a second number of bit periods; determining a second margin characteristic based upon the second contour; and using a margin normalization circuit operable to calculate a normalized value based upon a combination of the first margin characteristic and the second margin characteristic.

In some instances of the aforementioned embodiments, the methods further include: determining a target margin value; multiplying the target margin value by the normalized value to yield a margin output; formatting the margin output to yield a formatted margin output; and transmitting the formatted margin output to a recipient device over a bus. In some cases, the received serial data input is received from the recipient device via the bus. In particular cases, the bus is a PCIe™ bus. In one or more cases, the second number of bit periods is at least ten times greater than the first number of bit periods.

Yet other embodiments of the present inventions provide computer systems with a first electronic device and a second electronic device communicably coupled via a bus. The first electronic device includes: a first sampling latch operable to: sample a first received serial data input from the second electronic device via the bus, and provide a corresponding first serial data output; a first duration margin determination circuit operable to: define a first contour of a first data signal eye corresponding to the first serial data output over a first number of bit periods, and determine a first margin characteristic based upon the first contour of the first data signal eye; a second duration margin determination circuit operable to: define a second contour of the first data signal eye corresponding to the first serial data output over a second number of bit periods, and determine a second margin characteristic based upon the second contour of the first data signal eye; and a first margin normalization circuit operable to calculate a first normalized value based upon a combination of the first margin characteristic and the second margin characteristic. The second electronic device includes: a second sampling latch operable to: sample a second received serial data input from the first electronic device via the bus, and provide a corresponding second serial data output; a third duration margin determination circuit operable to: define a first contour of a second data signal eye corresponding to the second serial data output over a third number of bit periods, and determine a third margin characteristic based upon the first contour of the second data signal eye; a second duration margin determination circuit operable to: define a second contour of the second data signal eye corresponding to the second serial data output over a fourth number of bit periods, and determine a fourth margin characteristic based upon the second contour of the second data signal eye; and a second margin normalization circuit operable to calculate a second normalized value based upon a combination of the third margin characteristic and the fourth margin characteristic. In some cases, the first electronic device is a central processing unit and the second electronic device is a storage device.

Turning to FIG. 1, a bus based system 100 is shown that includes a master device 130, a target device 110, and additional devices 150, 160 all communicably connected via a bus 190. In some embodiments bus 190 is a PCIe™ bus as is known in the art. Based upon the disclosure provided herein, one of ordinary skill in the art will recognize other busses that may be used in relation to different embodiments of the inventions. Master device 130 may be any device known in the art that is capable of initiating a communication via bus 190. Master device 130 may in some cases additionally include circuitry capable of responding to communication requests initiated by other devices on bus 190. In one particular embodiment, master device 130 connects other devices on bus 190 to a host (not shown). Based upon the disclosure provided herein, one of ordinary skill in the art will recognize a variety of devices and device functions that may be used as master device 130. Target device 110 may be any device known in the art that is capable of engaging in a communication with a master device via bus 190. Target device 110 may in some cases additionally include circuitry capable of initiating communication via bus 190. In one particular embodiment, target device 110 connects other devices on bus 190 to a storage device (not shown). Based upon the disclosure provided herein, one of ordinary skill in the art will recognize a variety of devices and device functions that may be used as master device 130. In some embodiments, both target device 110 and master device 130 may include the same bus communication capabilities that are standard to the operation of bus 190. Additional devices 150, 160 may be other target and/or master devices serving other functions within system 100.

Figure 3:
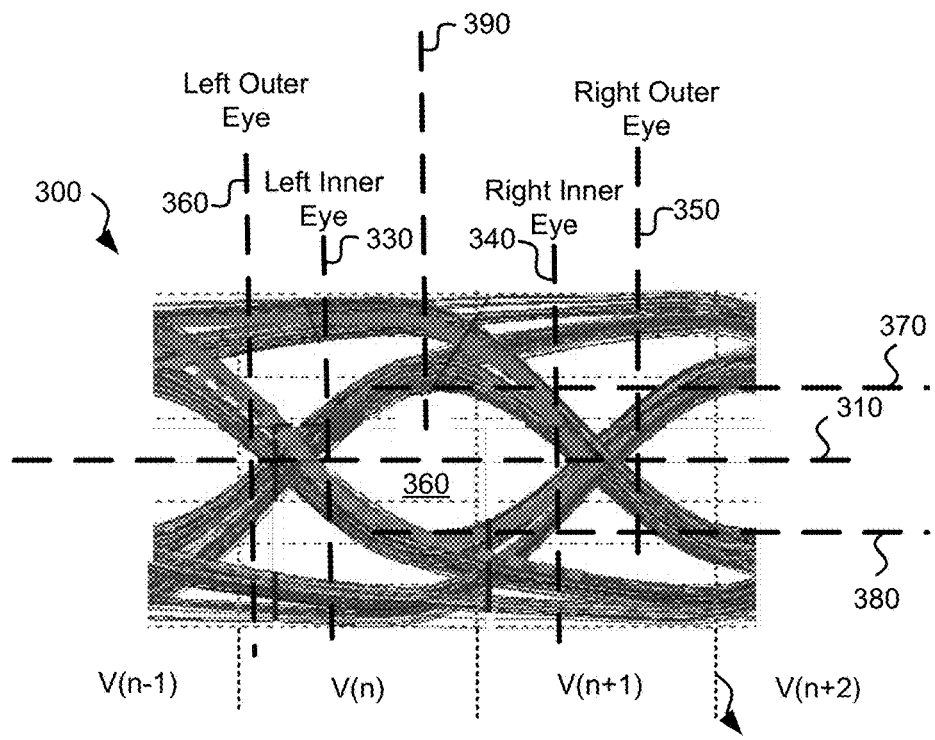
FIG. 3 graphically depicts an example data signal eye that may be characterized and represented using systems and/or methods in accordance with different embodiments of the present inventions.
Figure 5:
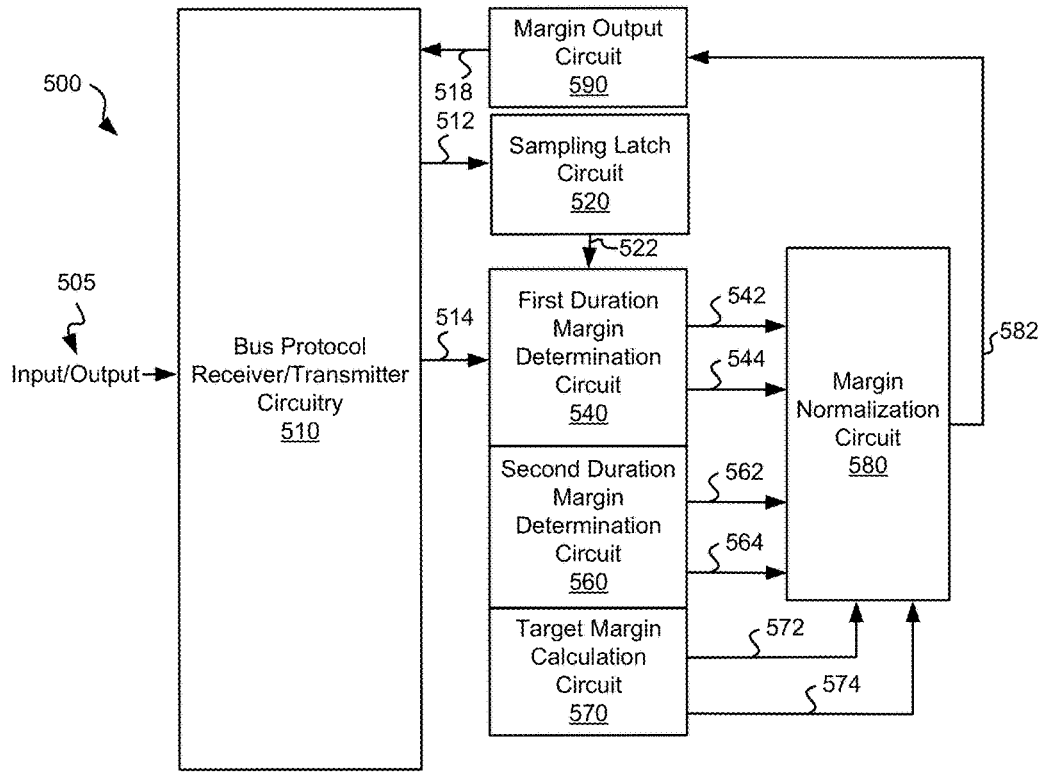
FIG. 5 shows a target device including normalized margin reporting circuitry in accordance with some embodiments of the present inventions.
Figure 7:
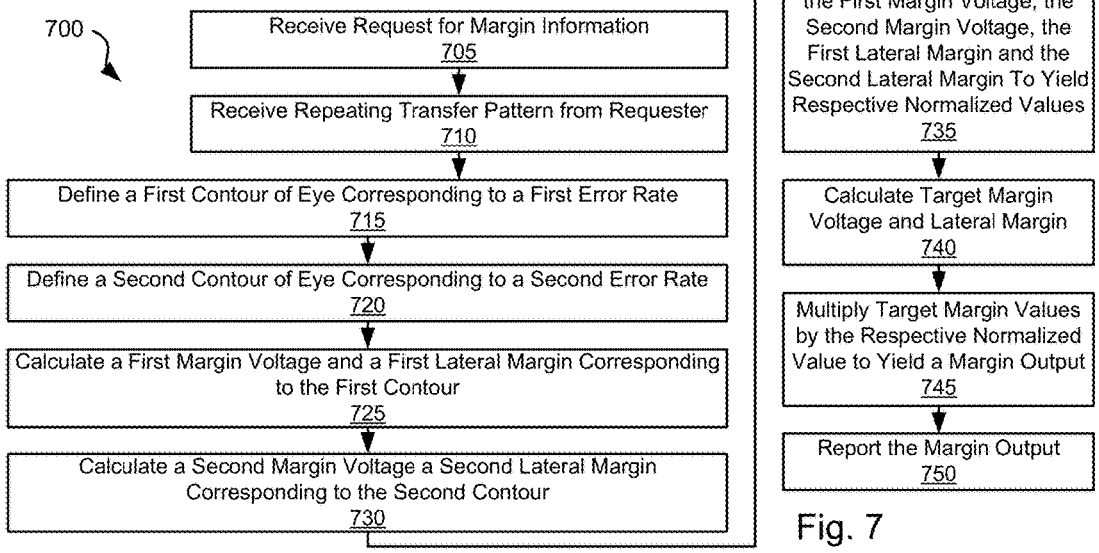
FIG. 7 is a flow diagram showing a method for eye margin determination in accordance with one or more embodiments of the present inventions.

Target device 110 includes normalized margin reporting circuitry in accordance with one or more embodiments of the present inventions. Such normalized margin reporting circuitry is capable of responding to a request for margin information from a requesting device where the response includes across device compatible margin information. Such margin information may include, but is not limited to, a left eye margin, a right eye margin, an upper eye margin, and a lower eye margin. In some cases, the margin information includes only the smaller of a left eye margin and a right eye margin provided as an offset margin, and only the smaller of an upper eye margin, and a lower eye margin provided as a voltage margin. This margin information is calculated based upon data transferred from a master device. FIG. 3 shows an example data signal eye relative to which an example set of margin information is described. FIG. 5 shows one implementation of a portion of a target device including normalized margin reporting circuitry that may be used in place of target device 110. FIG. 7 is a flow diagram showing a method for eye margin determination that may be implemented in relation to target device 110.

Figure 2:
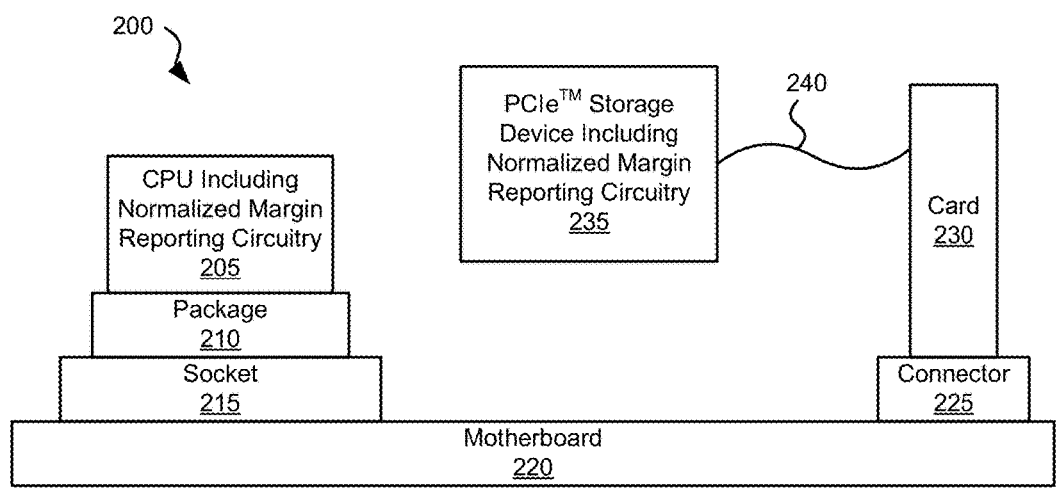
FIG. 2 shows another bus based system including a PCIe™ storage device having normalized margin reporting circuitry in accordance with some embodiments of the present inventions.

Turning to FIG. 2, another bus based system 200 is shown that includes a central processing unit (CPU) 205 that is incorporated into a package 210. Package 210 including CPU 205 is connectable to a motherboard 220 via a socket 215. A card 230 is connectable to motherboard 220 via a connector 225. An electrical connect such as, for example, a microstrip extends in motherboard 220 from socket 215 to connector 225 that electrically couples CPU 205 to card 230. Another electrical connect extends in card 230 from connector 225 to a serial attached SCSI (SAS) connector 240, and SAS connector 240 connects a PCIe™ storage device 235 to card 230. In such a configuration, CPU 205 is able to communicate to PCIe™ storage device 235 via a PCIe™ bus formed by the electrical connect, and PCIe™ storage device 235 is able to communicate to CPU 205 via the PCIe™ bus formed by the electrical connect.

PCIe™ storage device 235 includes normalized margin reporting circuitry in accordance with one or more embodiments of the present inventions. Such normalized margin reporting circuitry is capable of responding to a request for margin information from a requesting device where the response includes across device compatible margin information. Such margin information may include, but is not limited to, a left eye margin, a right eye margin, an upper eye margin, and a lower eye margin. In some cases, the margin information includes only the smaller of a left eye margin and a right eye margin provided as an offset margin, and only the smaller of an upper eye margin, and a lower eye margin provided as a voltage margin. This margin information is calculated based upon data transferred from a master device. FIG. 5 shows one implementation of a portion of a target device including normalized margin reporting circuitry that may be used in place of PCIe™ storage device 235. FIG. 7 is a flow diagram showing a method for eye margin determination that may be implemented in relation to PCIe™ storage device 235.

Turning to FIG. 3, a graphical depiction 300 of an example data signal eye is shown that may be characterized and represented using systems and/or methods in accordance with different embodiments of the present inventions. Graphical depiction 300 shows a number of symbol instances (e.g., V(n−1), V(n), V(n+1), V(n+2) separated by dotted lines) of a the serial data superimposed on upon the other. The superimposed symbol instances show a numbed of data transitions from 1→0, 0→1, 1→0 and 0→0. These superimposed symbol instances define an eye 360. As eye 360 is defined by the superimposition of a number of symbol instances and therefore there is some distance between an outer edges and inner edges of eye 360. In particular, a left outer edge 320 is offset from a left inner edge 330 at the left side of eye 360; and a right outer edge 350 is offset from a right inner edge 340 at the right side of eye 360. Sampling of the signal is optimally performed using a clock that is centered within eye 360 at a presumed horizontal eye location 390 using a threshold that is centered within eye 360 at a presumed vertical eye location 310. A left eye margin, a right eye margin, an upper margin, and a lower margin are characterized as the size of the opening of eye relative to presumed vertical eye location 310 or presumed horizontal eye location 390. In some embodiments, the left eye margin is calculated as a percentage of the time between left inner edge 330 and presumed horizontal eye location 390, the right eye margin is calculated as a percentage of the time between right inner edge 340 and presumed horizontal eye location 390, upper margin is calculated as a percentage of the voltage difference between an upper eye voltage level 370 and presumed vertical eye location 310, and lower margin is calculated as a percentage of the voltage difference between a lower eye voltage level 380 and presumed vertical eye location 310. Determining the characteristics of eye 360, and generating margin information based upon the determined characteristics may be done using any methods, circuitry and/or systems known in the art. Based upon the disclosure provided herein, one of ordinary skill in the art will recognize a variety of margin information that may be generated upon characterizing a signal eye in accordance with various embodiments of the present invention.

Figure 4:
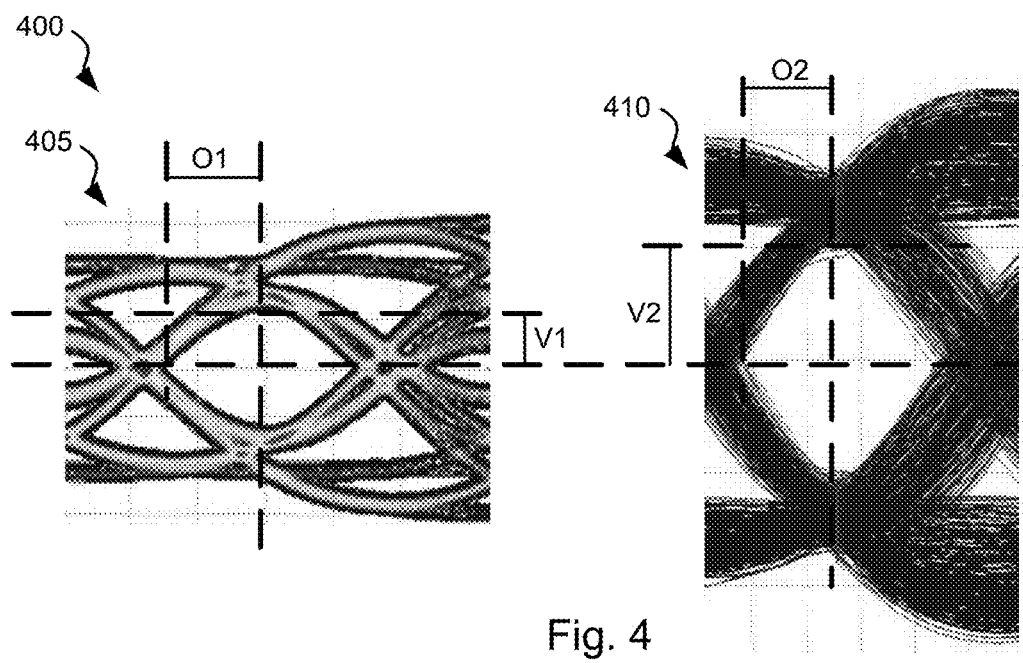
FIG. 4 graphically depicts two distinct data signal eyes at the same scale where each of the data signal eyes exhibit its own margin characteristics that may be characterized and represented using systems and/or methods in accordance with various embodiments of the present inventions.

Turning to FIG. 4, a graphic 400 shows two distinct data signal eyes 405, 410 at the same scale where each of data signal eye 405 and data signal eye 410 exhibit its own margin characteristics. In particular, an upper margin (V1) of data signal eye 405 is much less than an upper margin (V2) of data signal eye 410, while a left eye margin (O1) of data signal eye 405 is about the same as a left eye margin (O2) of data signal eye 410. In a typical margin reporting environment, the values of V1, V2, O1, and O2 would be reported to a device requesting margin information. These margins are determined by moving a sampling latch phase (i.e., changing the phase at which the data signal eye is sampled) and sampling latch voltage (i.e., changing the voltage used by the sampling latch to compare with the data signal eye) until the best margins are identified, and then those margins are reported. This approach, however, changes adaptation values and results in reshaping the data signal eye. As such, the margin values generated do not accurately represent the true data signal eye and are just "pseudo-margin information". In contrast, true operating margin is the amount of data signal eye above or below and to the left or right of the sampling latch.

The pseudo-margin information is generally useful in determining whether two devices can communicate together (e.g., whether a master device can produce an output signal within the reported margins). However, the pseudo-margin information does not provide much guidance in ranking two different devices. In particular, identifying a device with the margins from data signal eye 410 as better than a device with the margins from data signal eye 405 would be a mistake as it does not address the latch sensitivities exhibited by each of the devices. Said another way, the device with the margins from data signal eye 405 may have a latch that is very capable of handling the narrower V1 margin, while the device with the margins from data signal eye 410 may have a latch that is only just capable of handling the wider V2 margin. If such is the case, then the device with the margins from data signal eye 410 would arguably be considered less reliable than the device with the margins from data signal eye 410 even though the comparison of just the values of V1 and V2 may suggest otherwise.

Turning to FIG. 5, a target device 500 is shown that includes normalized margin reporting circuitry in accordance with some embodiments of the present inventions. Target device 500 includes, among other things, bus protocol receiver transmitter circuitry 510 that: receives an input from an input/output 505 when a requesting device (not shown) is requesting margin information from target device 500, and transmits an output to input/output 505 when target device 500 is responding to the request for margin information. A request for margin information indicates a voltage level and phase at which a target test is to be performed. In some embodiments, bus protocol receiver transmitter circuitry 510 is capable of communicating via a PCIe™ bus. Based upon the disclosure provided herein, one of ordinary skill in the art will recognize other bus protocols that may be supported by bus protocol receiver transmitter circuitry 510 in accordance with different embodiments.

When a request for margin information is received via input/output 505, bus protocol receiver transmitter circuitry 510 provides the received data to a sampling latch circuit 512 that samples the received serial data input 512 and provides a corresponding serial data output 522. In addition, bus protocol receiver transmitter circuitry 510 asserts a margin request enable 514. Upon assertion of margin request enable 514, a first duration margin determination circuit 540 begins receiving serial data output 522 which is generated by sampling latch circuit 520 sampling a repeating data pattern received as serial data input 512 from a requesting device via bus protocol receiver transmitter circuitry 510. The repeating data pattern may be any serial pattern of '1s' and '0s' that can be used to exercise a sampling latch within the target device. The sampling continues for a first number of bit periods. The samples captured by sampling latch circuit 520 are compared by first duration margin determination circuit 540 with expected values. The errors from the comparisons are used by first duration margin determination circuit 540 to define a second contour of a signal eye. This first contour is complete at the end of the first number of bit periods.

The sampling continues by sampling latch circuit 520 until a second number of bit periods is complete where the samples captured by the sampling latch for the second number of bit periods are compared by second duration margin determination circuit 560 with expected values. The errors from the comparisons are used by second duration margin determination circuit 560 to define a second contour of the signal eye. This second contour is complete at the end of the second number of bit periods.

In one particular embodiment, the first number of bit periods is one thousand (1000) bit periods, and the second number of bit periods is one billion (1000000000) bit periods. Based upon the disclosure provided herein, one of ordinary skill in the art will recognize a variety of numbers of bit periods that may be used for both the first number of bit periods and the second number of bit periods. The longer (i.e., the larger of numbers of bit periods) the repeating transfer pattern is processed, the smaller the eye will become due to the occurrence of noise. Thus, where the repeating transfer pattern is sampled for a small period of time, a relatively large contour will be defined when compared to a contour defined based upon sampling over a much larger period of time.

Figure 6A:
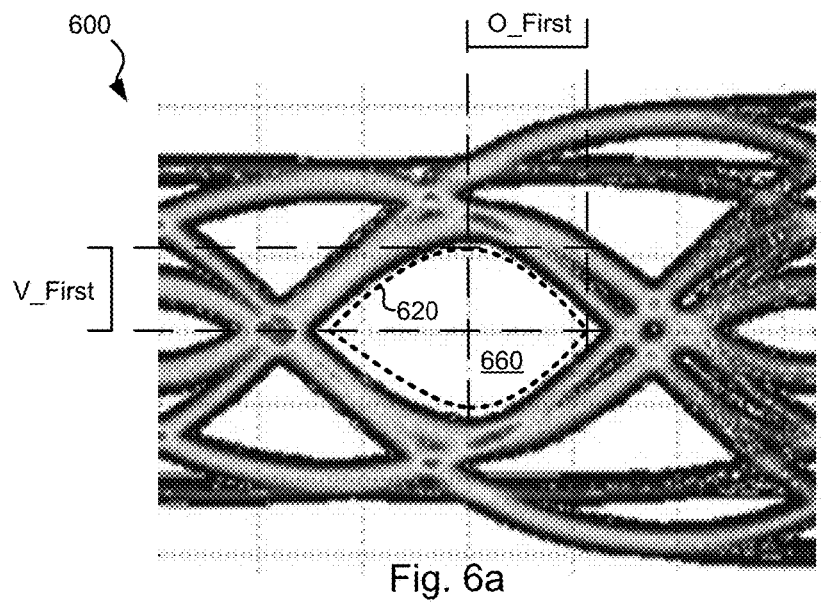
FIGS. 6a and 6b depict the same data signal eye with a contour representing different bit error rates that are used in margin calculation in accordance with various embodiments of the present inventions.
Figure 6B:
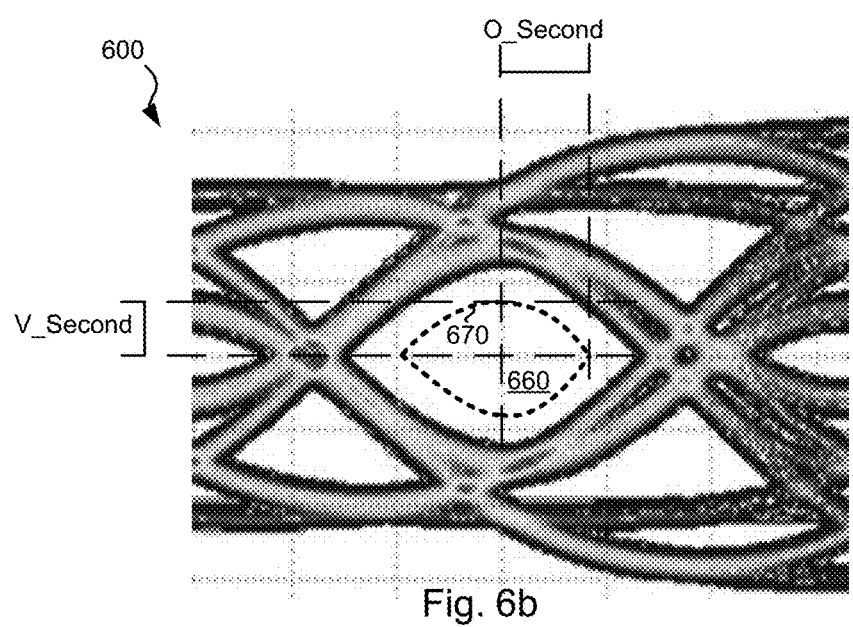

Turning to FIGS. 6a and 6b, the same data signal eye 660 is shown with a first contour 620 (graphic 600 of FIG. 6a) and a second contour 670 (graphic 650 of FIG. 6b) are shown. First contour 620 is defined based upon a first number of samplings of a received pattern, and second contour 670 is defined based upon a second number of samplings where the second number of samplings is greater than the first number of samplings. The samplings for both first contour 620 and second contour 670 are made using the same latch triggered at the same fixed phase and voltage. As shown in FIG. 6a, a right eye margin (O_First) and an upper margin (V_First) are calculated based upon contour 620. In particular, V_First is a difference between a voltage threshold for the latch and an upper voltage of contour 620, and O_First is a difference between a phase at which the latch is triggered and a right extreme of contour 620. As shown in FIG. 6b, a right eye margin (O_Second) and an upper margin (V_Second) are calculated based upon contour 670. In particular, V_Second is a difference between a voltage threshold for the latch and an upper voltage of contour 670, and O_Second is a difference between a phase at which the latch is triggered and a right extreme of contour 670. As the number of samplings used to define contour 670 is greater than the number used to define contour 620, O_First is expected to be greater than O_Second and V_First is expected to be greater than V_Second.

Returning to FIG. 5, first duration margin determination circuit 540 uses the first contour to define a first margin voltage 542 and a first lateral margin 544 for the data signal eye corresponding to a sample duration of the first number of bit periods. Calculating the first margin voltage for the first contour includes identifying a maximum and minimum voltage of the first contour, calculating a difference between the maximum voltage and the latch threshold voltage to yield an upper eye margin, and calculating a difference between the minimum voltage and the latch threshold voltage to yield a lower eye margin. First duration margin determination circuit 540 selects the one of the upper eye margin or the lower eye margin with the lowest magnitude as first margin voltage 542. Similarly, a left extreme and a right extreme of the first contour are identified by first duration margin determination circuit 540. A difference between the sampling phase of the latch and the right extreme is calculated to yield a right eye margin, and a difference between the sampling phase of the latch and the left extreme is calculated to yield a left eye margin. The one of the right eye margin or the left eye margin with the lowest magnitude is selected by first duration margin determination circuit 540 as a first lateral margin voltage 544.

Second duration margin determination circuit 560 uses the second contour to define a second margin voltage 562 and a second lateral margin 564 for the data signal eye corresponding to a sample duration of the second number of bit periods. Calculating the second margin voltage for the second contour includes identifying a maximum and minimum voltage of the second contour, calculating a difference between the maximum voltage and the latch threshold voltage to yield an upper eye margin, and calculating a difference between the minimum voltage and the latch threshold voltage to yield a lower eye margin. Second duration margin determination circuit 560 selects the one of the upper eye margin or the lower eye margin with the lowest magnitude as the second margin voltage 562. Similarly, a left extreme and a right extreme of the second contour are identified by second duration margin determination circuit 560. A difference between the sampling phase of the latch and the right extreme is calculated to yield a right eye margin, and a difference between the sampling phase of the latch and the left extreme is calculated to yield a left eye margin. The one of the right eye margin or the left eye margin with the lowest magnitude is selected by second duration margin determination circuit 560 as a second lateral margin voltage 564.

A target margin calculation circuit 570 sets the latch threshold voltage and phase of the sampling latch shared between first duration margin determination circuit 540 and second duration margin determination circuit 560 in accordance with the voltage and phase level indicated in the request for margin information, and measures an upper eye margin, a lower eye margin, a left eye margin, and a right eye margin of a resulting data signal eye. Target margin calculation circuit 570 then selects the one of the upper eye margin and the lower eye margin with the lowest magnitude as a target margin voltage 572, and the one of the right eye margin and the left eye with the lowest magnitude as a target lateral margin 574. The measurement of the upper eye margin, the lower eye margin, the left eye margin, and the right eye margin may be done using any approach known in the art for measuring margins in a data signal eye.

In some embodiments, target margin calculation circuit 570 is a third duration margin determination circuit that determines a third contour over a shorter duration than both first duration margin determination circuit 540 and second duration margin determination circuit 560. In some cases, the highest voltage on the third contour is reported as a maximum voltage to a requester via bus protocol receiver/transmitter circuitry 510. This shorter duration for the third duration margin determination circuit results in a third contour that is larger than either the first contour or the second contour as shown in FIGS. 6a-6b. In particular, where target margin calculation circuit 570 is a third duration margin determination circuit that determines a third contour over a shorter duration than both first duration margin determination circuit 540 and second duration margin determination circuit 560 as described above, the third contour will be larger than the both first contour 620 and second contour 670. This results in a right eye margin, a left eye margin, an upper margin, and a lower margin for the third contour that are greater than the corresponding characteristics of first contour 620 and second contour 670. In some cases, the highest magnitude voltage (i.e., either the upper margin or the lower margin) on the third contour is reported as a maximum voltage to a requester via bus protocol receiver/transmitter circuitry 510.

When first margin voltage 542, first lateral margin 544, second margin voltage 562, second lateral margin 564, target margin voltage 572, and target lateral margin 574 are available, a margin normalization circuit 580 divides second margin voltage 564 by first margin voltage 542 to yield a normalized voltage value in accordance with the following equation:

$$\text{Normalized Lateral Value} = \frac{\text{Second Margin Voltage}}{\text{First Margin Voltage}}.$$

In addition, margin normalization circuit 580 divides second lateral margin by first lateral margin 544 to yield a normalized lateral value in accordance with the following equation:

$$\text{Normalized Lateral Value} = \frac{\text{Second Lateral Margin}}{\text{First Lateral Margin}}.$$

Margin normalization circuit 580 then calculates a margin output 582 by multiplying target margin voltage 572 by the normalized voltage value to yield a normalized voltage margin, and multiplying target lateral margin 574 by the normalized lateral value to yield a normalized lateral margin. The combination of the normalized voltage margin and the normalized lateral margin are provided as a Margin output 582. Margin output 582 is then formatted by a margin output circuit 590 to yield a formatted output 518, and the formatted output 518 is transfer to the device that requested the margin information by bus protocol receiver transmitter circuitry 510. In some cases, the formatting performed by margin output circuit 590 includes quantizing margin output 582 to an eight bit number indicating the respective values in defined magnitudes (e.g., millivolts and nanoseconds).

Turning to FIG. 7, a flow diagram 700 shows a method for eye margin determination in accordance with one or more embodiments of the present inventions. Following flow diagram 700, a request for margin information is received (block 705). This request for margin information may be received, for example, from another device connected to a bus shared by the target device by which the margin request is received. In some embodiments, the bus is a PCIe™ bus. Based upon the disclosure provided herein, one of ordinary skill in the art will recognize other busses that may be used in relation to different embodiments.

After the request is received, a repeating transfer pattern is received via the bus (block 710). This repeating data pattern may be any serial pattern of '1s' and '0s' that can be used to exercise a sampling latch within the target device. A first contour of the eye defined by sampling the repeating data pattern for a first number of sampling periods (block 715), and a second contour of the eye defined by sampling the repeating data pattern for a second number of sampling periods (block 720). The first contour is defined as the location of errors between latched data and expected data when sampling the received data using a latch triggered at a fixed phase and voltage, and the second contour is defined as the location of errors between latched data and expected data when sampling the received data using the same latch triggered at the same fixed phase and voltage. The second number of sampling periods is greater than the first number of sampling periods. In one particular embodiment, the first number of sampling periods is one thousand (1000) sampling periods, and the second number of sampling periods is one billion (1000000000) sampling periods. Based upon the disclosure provided herein, one of ordinary skill in the art will recognize a variety of numbers of sampling periods that may be used for both the first number of sampling periods and the second number of sampling periods. The longer (i.e., the larger of numbers of bit periods) the repeating transfer pattern is processed, the smaller the eye will become due to the occurrence of noise. Thus, where the repeating transfer pattern is sampled for a small period of time, a relatively large contour will be defined when compared to a contour defined based upon sampling over a much larger period of time.

Turning to FIGS. 6a and 6b, the same data signal eye 660 is shown with a first contour 620 (graphic 600 of FIG. 6a) and a second contour 670 (graphic 650 of FIG. 6b) are shown. First contour 620 is defined based upon a first number of samplings of a received pattern, and second contour 670 is defined based upon a second number of samplings where the second number of samplings is greater than the first number of samplings. The samplings for both first contour 620 and second contour 670 are made using the same latch triggered at the same fixed phase and voltage. As shown in FIG. 6a, a right eye margin (O_First) and an upper margin (V_First) are calculated based upon contour 620. In particular, V_First is a difference between a voltage threshold for the latch and an upper voltage of contour 620, and O_First is a difference between a phase at which the latch is triggered and a right extreme of contour 620. As shown in FIG. 6b, a right eye margin (O_Second) and an upper margin (V_Second) are calculated based upon contour 670. In particular, V_Second is a difference between a voltage threshold for the latch and an upper voltage of contour 670, and O_Second is a difference between a phase at which the latch is triggered and a right extreme of contour 670. As the number of samplings used to define contour 670 is greater than the number used to define contour 620, O_First is expected to be greater than O_Second and V_First is expected to be greater than V_Second.

Retuning to FIG. 7, a first margin voltage and a first lateral margin are calculated for the first contour (block 725). This includes identifying a maximum and minimum voltage of the first contour, calculating a difference between the maximum voltage and the latch threshold voltage to yield an upper eye margin, and calculating a difference between the minimum voltage and the latch threshold voltage to yield a lower eye margin. The one of the upper eye margin or the lower eye margin with the lowest magnitude is selected as the first margin voltage. Similarly, a left extreme and a right extreme of the first contour are identified. A difference between the sampling phase of the latch and the right extreme is calculated to yield a right eye margin, and a difference between the sampling phase of the latch and the left extreme is calculated to yield a left eye margin. The one of the right eye margin or the left eye margin with the lowest magnitude is selected as the first lateral margin.

A second margin voltage and a second lateral margin are calculated for the second contour (block 730). This includes identifying a maximum and minimum voltage of the second contour, calculating a difference between the maximum voltage and the latch threshold voltage to yield an upper eye margin, and calculating a difference between the minimum voltage and the latch threshold voltage to yield a lower eye margin. The one of the upper eye margin or the lower eye margin with the lowest magnitude is selected as the second margin voltage. Similarly, a left extreme and a right extreme of the second contour are identified. A difference between the sampling phase of the latch and the right extreme is calculated to yield a right eye margin, and a difference between the sampling phase of the latch and the left extreme is calculated to yield a left eye margin. The one of the right eye margin or the left eye margin with the lowest magnitude is selected as the second lateral margin.

A combination of the first margin voltage, the second margin voltage, the first lateral margin, and the second lateral margin is used to calculate a normalized voltage value for the voltage margin and a normalized lateral margin (block 735). In particular, the normalized voltage value and the normalized lateral value are calculated in accordance with the following equations:

$$\text{Normalized Voltage Value} = \frac{\text{Second Margin Voltage}}{\text{First Margin Voltage}}; \text{ and}$$

$$\text{Normalized Lateral Value} = \frac{\text{Second Lateral Margin}}{\text{First Lateral Margin}}.$$

A target margin voltage and lateral margin are calculated (block 740). This includes setting the latch threshold voltage and phase at an instructed level with the instructed level being provided as part of the request for margin information, and measuring an upper eye margin, a lower eye margin, a right eye margin, and a left eye margin for the instructed level. The one of the upper eye margin and the lower eye margin with the lowest magnitude is selected as the target margin voltage, and the one of the right eye margin and the left eye margin with the lowest magnitude is selected as the lateral margin. Together the target margin voltage and the lateral margin are target margin values. In some embodiments, the target margin calculation includes generating a third contour over a shorter duration than both first contour and the second contour. In some cases, the highest voltage on the third contour is reported as a maximum voltage to a requester via bus protocol receiver/transmitter circuitry. This shorter duration for the third duration margin determination circuit results in a third contour that is larger than either the first contour or the second contour as shown in FIGS. 6a-6b.

In particular, where target margin calculation circuit 570 is a third duration margin determination circuit that determines a third contour over a shorter duration than both first duration margin determination circuit 540 and second duration margin determination circuit 560 as described above, the third contour will be larger than the both first contour 620 and second contour 670. This results in a right eye margin, a left eye margin, an upper margin, and a lower margin for the third contour that are greater than the corresponding characteristics of first contour 620 and second contour 670. In some cases, the highest magnitude voltage (i.e., either the upper margin or the lower margin) on the third contour is reported as a maximum voltage to a requester via bus protocol receiver/transmitter circuitry 510.

The target margin values are then multiplied by the respective normalized values to yield a margin output in accordance with the following equations:

Voltage Margin Output=Normalized Voltage Value*Target Margin Voltage; and

Lateral Margin Output=Normalized Lateral Value*Lateral Margin (block 745). Together the lateral margin output and voltage margin output are considered a margin output. The margin output is then reported back to the requesting device (block 750).

Figure 8A:
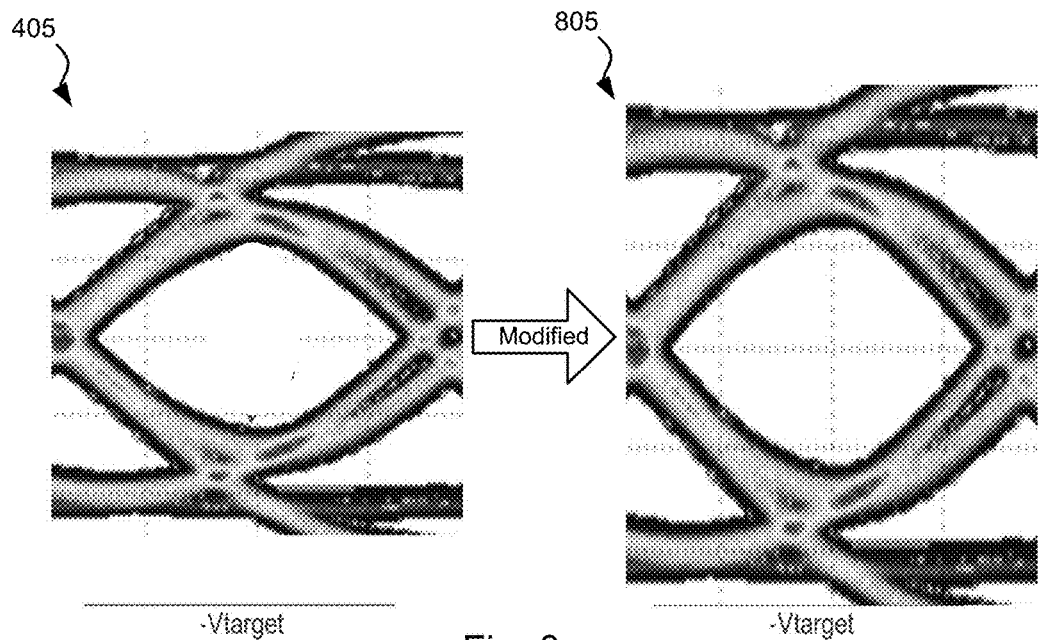
FIGS. 8a-8b depicts the two distinct data signal eyes of FIG. 4 each modified in accordance with embodiments of the present inventions to yield accurate reporting margins.
Figure 8B:
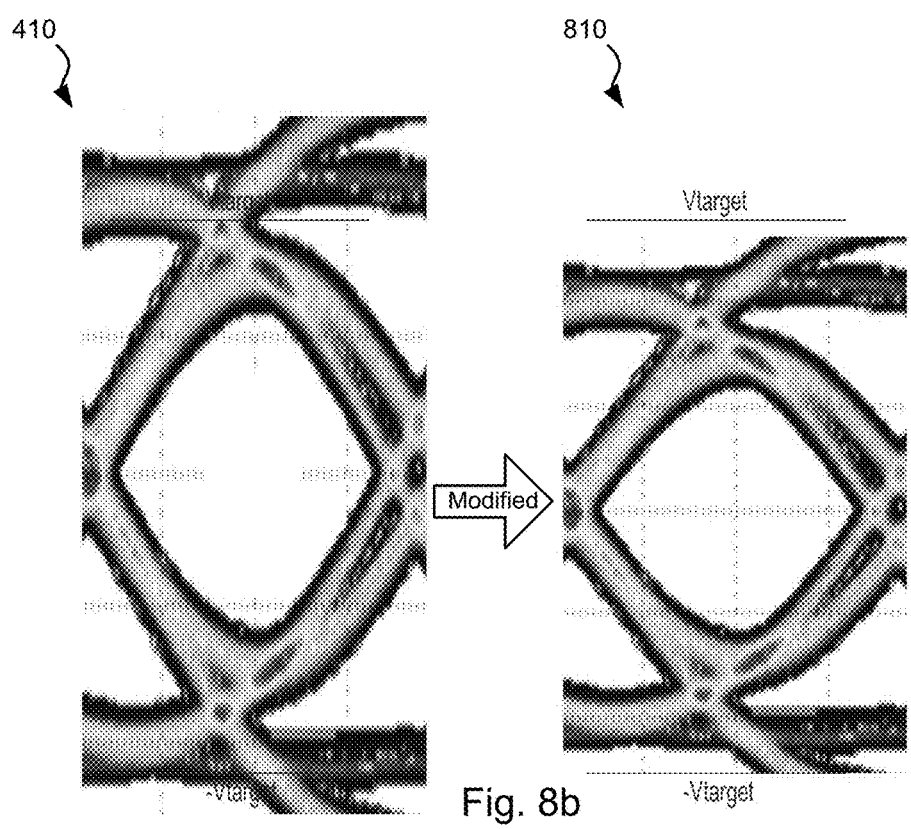

Turning to FIG. 8a, data signal eye 405 of FIG. 4 is represented as a modified data signal eye 805 corresponding to the margin output provided in response to a request for margin information as was discussed above relation to FIG. 5 and FIG. 7. Of note, modified data signal eye 805 includes an increase in the voltage margin when compared with data signal eye 405. Turning to FIG. 8b, data signal eye 410 of FIG. 4 is represented as a modified data signal eye 810 corresponding to the margin output provided in response to a request for margin information as was discussed above relation to FIG. 5 and FIG. 7. Of note, modified data signal eye 805 includes an decrease in the voltage margin when compared with data signal eye 805. Using the modification process and circuitry discussed herein in relation to FIG. 4 and FIG. 5, the margins reported (i.e., the margins for data signal eye 805 and data signal eye 810) for each of data signal eyes 405, 410 are meaningfully comparable.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent—albeit such an entirely software or firmware system would not be a circuit. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
    a sampling latch operable to sample a received serial data input and provide a corresponding serial data output;
    a first duration margin determination circuit operable to: define a first contour of a data signal eye corresponding to the serial data output over a first number of bit periods, and determine a first margin characteristic based upon the first contour;
    a second duration margin determination circuit operable to: define a second contour of the data signal eye corresponding to the serial data output over a second number of bit periods, and determine a second margin characteristic based upon the second contour;
    a margin normalization circuit operable to calculate a normalized value based upon a combination of the first margin characteristic and the second margin characteristic; and
    a transmission circuit operable to transmit an output to a requesting device, wherein the output transmitted by the transmission circuit is indicative of the normalized value.

2. The system of claim 1, the system further comprising:
    a target margin calculation circuit operable to determine a target margin value; and
    wherein the margin normalization circuit is further operable to multiply the target margin value by the normalized value to yield a margin output that is included in the output transmitted by the transmission circuit.

3. The system of claim 2, wherein the target margin calculation circuit is a third duration margin determination circuit operable to: define a third contour of the data signal eye corresponding to the serial data output over a third number of bit periods, and determine the target margin characteristic based upon the third contour, and wherein the third number of bit periods is less than both the first number of bit periods and the second number of bit periods.

4. The system of claim 3, wherein the target margin characteristic is a maximum voltage and wherein the transmission circuit is operable to transmit the maximum voltage to the requesting device via a communication bus.

5. The system of claim 2, the system further comprising:
    a margin output circuit operable to format the margin output to yield a formatted margin output, wherein the transmission circuit is operable to transmit the formatted margin output to the recipient device.

6. The system of claim 5, wherein the received serial data input is received from the recipient device via a bus.

7. The system of claim 6, wherein the bus is a PCie™ bus.

8. The system of claim 1, wherein the second number of bit periods is at least ten times greater than the first number of bit periods.

9. The system of claim 8, wherein the second number of bit periods is greater than one hundred million bit periods and the first number of bit periods is less that one hundred thousand bit periods.

10. The system of claim 2, wherein the first margin characteristic is a first lateral margin, the second margin characteristic is a second lateral margin, and the target margin value is a target margin voltage.

11. The system of claim 2, wherein the first margin characteristic is a first margin voltage, the second margin characteristic is a second margin voltage, and the target margin value is a target lateral margin.

12. The system of claim 1, wherein calculating the normalized value based upon the combination of the first margin characteristic and the second margin characteristic includes dividing the second margin characteristic by the first margin characteristic.

13. The system of claim 1, wherein defining the first contour of the data signal eye includes comparing the serial data output with expected values over the first number of bit periods; and wherein defining the second contour of the data signal eye includes comparing the serial data output with expected values over the second number of bit periods.

14. The system of claim 1, wherein the system is implemented as part of a storage device.

15. A method for margin determination, the method comprising:
    repeatedly sampling a received serial data input by a sampling latch circuit to yield a corresponding serial data output;
    defining a first contour of a data signal eye corresponding to the serial data output over a first number of bit periods;
    determining a first margin characteristic based upon the first contour;
    defining a second contour of a data signal eye corresponding to the serial data output over a second number of bit periods;
    determining a second margin characteristic based upon the second contour;
    using a margin normalization circuit operable to calculate a normalized value based upon a combination of the first margin characteristic and the second margin characteristic; and
    transmitting an output to a recipient device that is indicative of the normalized value.

16. The method of claim 15, the method further comprising:
    determining a target margin value;
    multiplying the target margin value by the normalized value to yield a margin output;
    formatting the margin output to yield a formatted margin output; and
    transmitting the formatted margin output to the recipient device as part of the output.

17. The method of claim 15, the method further comprising:
    defining a third contour of a data signal eye corresponding to the serial data output over a third number of bit periods, wherein the third number of bit periods is less than both the first number of bit periods and the second number of bit periods;
    determining a target margin characteristic based upon the third contour.

18. The method of claim 17, wherein the target margin characteristic is a maximum value of the third contour, and wherein the method further comprises:
    transmitting the maximum value of the third contour to the requesting device.

19. The method of claim 16, wherein the received serial data input is received from the recipient device via a bus.

20. The method of claim 19, wherein the bus is a PCie™ bus.

21. The method of claim 15, wherein the second number of bit periods is at least ten times greater than the first number of bit periods.

22. A computer system, the system comprising:
a first electronic device and a second electronic device communicably coupled by a bus;
wherein the first electronic device includes:
   a first sampling latch operable to: sample a first received serial data input from the second electronic device via the bus, and provide a corresponding first serial data output;
   a first duration margin determination circuit operable to: define a first contour of a first data signal eye corresponding to the first serial data output over a first number of bit periods, and determine a first margin characteristic based upon the first contour of the first data signal eye;
   a second duration margin determination circuit operable to: define a second contour of the first data signal eye corresponding to the first serial data output over a second number of bit periods, and determine a second margin characteristic based upon the second contour of the first data signal eye;
   a first margin normalization circuit operable to calculate a first normalized value based upon a combination of the first margin characteristic and the second margin characteristic; and
   a first transmission circuit operable to transmit a first output indicative of the first normalized value to a requesting device;
and wherein the second electronic device includes:
   a second sampling latch operable to: sample a second received serial data input from the first electronic device via the bus, and provide a corresponding second serial data output;
   a third duration margin determination circuit operable to: define a first contour of a second data signal eye corresponding to the second serial data output over a third number of bit periods, and determine a third margin characteristic based upon the first contour of the second data signal eye;
   a second duration margin determination circuit operable to: define a second contour of the second data signal eye corresponding to the second serial data output over a fourth number of bit periods, and determine a fourth margin characteristic based upon the second contour of the second data signal eye;
   a second margin normalization circuit operable to calculate a second normalized value based upon a combination of the third margin characteristic and the fourth margin characteristic; and
   a second transmission circuit operable to transmit a second output indicative of the second normalized value to the requesting device.

23. The system of claim 22, wherein:
the first electronic device further includes:
   a first target margin calculation circuit operable to determine a first target margin value; and
   wherein the first margin normalization circuit is further operable to multiply the first target margin value by the first normalized value to yield a first margin output; and
   a first data output circuit operable to communicate a first margin value derived from the first margin output to the second electronic device over the bus; and
the second electronic device further includes:
   a second target margin calculation circuit operable to determine a second target margin value; and
   wherein the second margin normalization circuit is further operable to multiply the second target margin value by the second normalized value to yield a second margin output; and
   a second data output circuit operable to communicate a second margin value derived from the second margin output to the first electronic device over the bus.

24. The system of claim 22, wherein the second number of bit periods is at least ten times greater than the first number of bit periods; and wherein the fourth number of bit periods is at least ten times greater than the third number of bit periods.

* * * * *